March 15, 1932.　　　　G. H. BURRILL　　　　1,849,449
TRACTOR HITCH
Filed Feb. 11, 1931
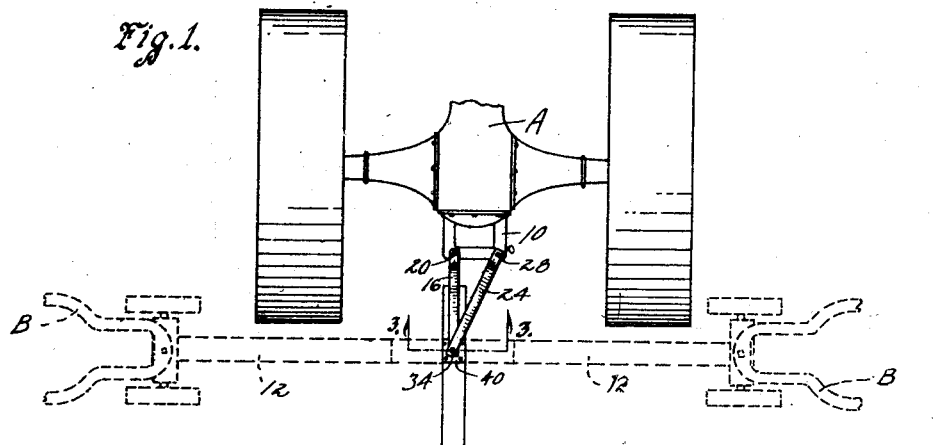
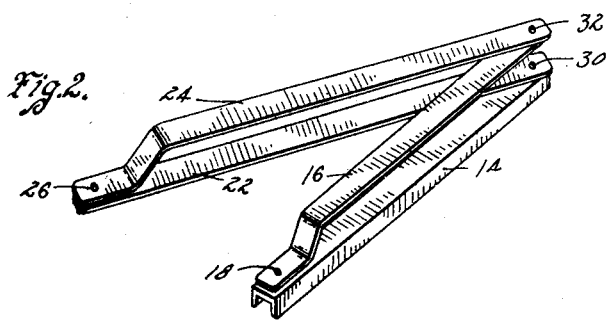
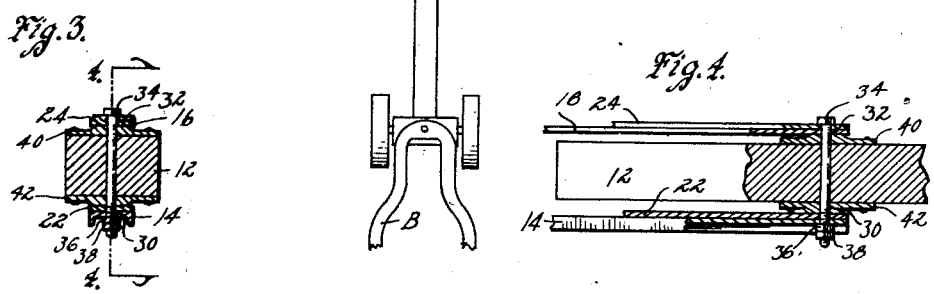
Inventor
~George H. Burrill~
by Bair, Freeman & Sinclair
Attorneys
Witness
H. S. Wenzenmaier Patented Mar. 15, 1932

1,849,449

UNITED STATES PATENT OFFICE

GEORGE H. BURRILL, OF STRUBLE, IOWA

TRACTOR HITCH

Application filed February 11, 1931. Serial No. 514,996.

The object of this invention is to provide an improved hitching means adapted for use in connecting a follower machine to a tractor, the hitching means being so arranged that the pivot point upon which the follower machine swings is located at a point rearwardly of the rear line of the tractor mechanism, whereby a substantially square turn may be made.

A further object of the invention is to provide an improved tractor hitch which is sturdy and also comparatively inexpensive and which will not become uncoupled accidentally in use.

With these and other objects in view my invention consists in the construction, arrangement and combination of the various parts of my device, whereby the objects contemplated are attained, as hereinafter more fully set forth, pointed out in my claim, and illustrated in the accompanying drawings, in which:—

Figure 1 is a plan view showing portions of a tractor and a follower machine connected thereto by means of my improved hitch, the dotted lines indicating right angled positions which may be assumed by the follower machine in making a turn either to the right or to the left.

Figure 2 is a perspective view of the hitching means detached.

Figure 3 is a detail cross section on the line 3—3 of Figure 1.

Figure 4 is a detail longitudinal section on the line 4—4 of Figure 3.

In the drawings I have shown a portion of the rear end of a tractor, designated by the character A, and a small portion of the forward end of a follower machine, such as a binder, designated by the character B. The rear end of the tractor A is provided with a draw bar 10 of ordinary form. The type of draw bar here shown is substantially rectangular and has considerable width in a direction transversely of the tractor. The follower machine B is provided with a forwardly extending pole or tongue 12.

The hitch device includes a draft member 14 which preferably is composed of a channel bar arranged with its channel opening downwardly and said draft member is designed to be located beneath the draw bar 10 and tongue 12. Coacting with the draft member 14 is an offset bar 16 of flat metal which is arranged above the draw bar 10 and tongue 12 and parallel with the said draft member.

The draft member 14 and offset bar 16 are formed at their forward ends with registering holes 18 and they are adapted to embrace and engage the draw bar 10 at its rear left corner and to be secured thereto by a bolt 20 which passes through the holes 18 and a corresponding hole in the draw bar.

An oblique brace is provided which is composed of a flat bar 22 and an offset bar 24 arranged substantially parallel therewith.

The bars 22 and 24 are provided with registering holes 26 at their forward ends and they are adapted to embrace and engage the draw bar 10 of the tractor at the rear right corner thereof, and to be secured thereto by a bolt 28 passing through the holes 26 and through a corresponding hole in the said draw bar.

The rear end portion of the hitch device embraces and engages the forward portion of the tongue 12 which normally is aligned with the draft member 14 and the offset bar 16 as shown by solid lines in Figure 1. The rear end portion of the oblique brace composed of the flat bar 22 and offset bar 24 overlaps the rear portion of the draft member 14 and offset member 16 and also embraces and engages the tongue 12.

The overlapping rear end portions of the draft member 14 and flat brace member 22 are formed with registering openings at 30 and the overlapping rear ends of the offset bars 16 and 24 are formed with registering openings at 32. A king bolt 34 is extended through the openings 32, through an opening in the tongue 12 and through the registering opening 30 of the lower members of the hitch device and preferably is secured by means of a nut 36 and lock nut 38. The tongue 12 may, as in the ordinary construction, be provided with wear plates 40 and 42 located respectively on its upper and lower surfaces and these plates receive the actual contact of the respective members of the hitch device.

It will be noted that the hitch device has a two point rigid connection with the draw bar 10 of the tractor by means of the bolts 20 and 28 and that when the parts are coupled up there can be no relative movement of the parts of the hitch device and the king bolt 34 will be carried at a fixed point which is located entirely rearwardly of the rear wheels or wheel fenders of the tractor.

The hitch device may, of course, be employed for connecting any kind of follower or trailer machine to a tractor, and it may be pivotally attached to any suitable part of such machine.

It will be noted particularly that the location of the pivot 34 by which the follower machine is attached to the hitch device permits the tongue 12 to swing to any desired extent in following the tractor, up to and including the making of a square or right angled turn as in rounding a corner. The position which the tongue and follower machine may assume in turning a square corner in either direction is indicated by dotted lines in Figure 1.

The hitch device is sturdy, strong and durable, and is inexpensive to manufacture, and easy to install. Furthermore, there is no danger that it will become unfastened or uncoupled accidentally due to jolting or oscillation when it is being used.

The offset construction of the bars 16 and 24 compensates for the difference in thickness in a vertical plane of the draw bar 10 which usually is made of flat metal, and the tongue 12 which is usually made of wood and which is of considerable thickness.

Some changes may be made in the construction and arrangement of the parts of my device without departing from the real spirit and purpose of my invention, and it is my intention to cover by my claim, any modified forms of structure or use of mechanical equivalents, which may be reasonably included within their scope.

I claim as my invention:—

A hitch device for a tractor having a wide and thin drawbar, comprising a draft member of channel form mounted beneath the draw bar at one side thereof and a bar of flat material parallel with said draft member and engaging above the draw bar, a bolt for conjunctively securing said draft member and flat bar to the draw bar a pair of parallel brace members engaging on opposite faces of the draw bar and conjunctively secured thereto at the opposite side from said draft member, said brace members being of greater length than the draft member and flat bar and being obliquely arranged and overlapping the draft member and flat bar at their rear ends, a king bolt for conjunctively pivoting all of said members to a part of a follower machine, said flat bar and the uppermost brace member being offset between their ends so that their rear end portions are spaced greater distances respectively from the draft bar and lowermost brace bar for engaging a part of the follower machine between said members.

Des Moines, Iowa, September 3, 1930.

GEORGE H. BURRILL.